E. K. CONOVER.
BRAKE OPERATING APPARATUS.
APPLICATION FILED APR. 16, 1907.
1,076,100.
Patented Oct. 21, 1913.
2 SHEETS—SHEET 2.
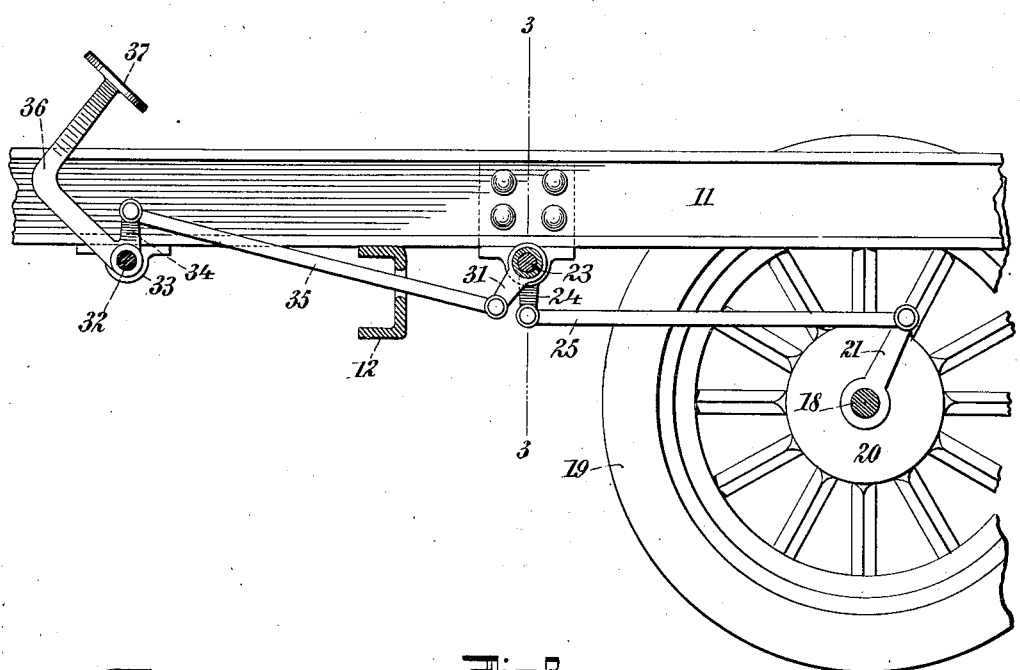
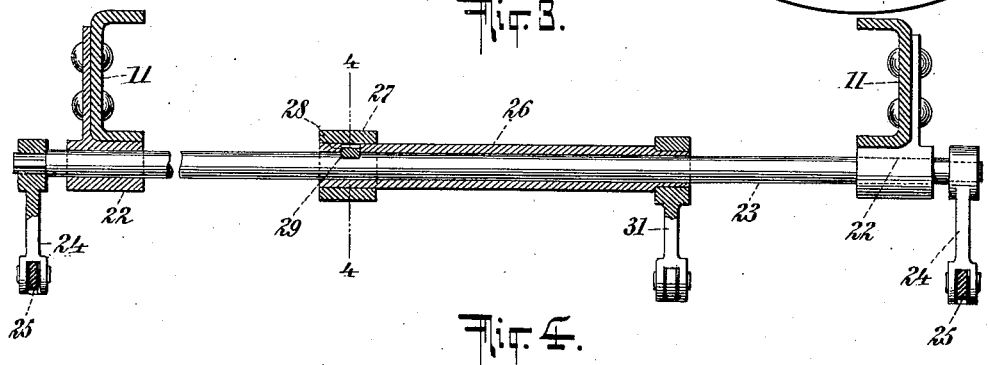
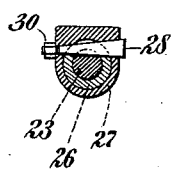
WITNESSES:
INVENTOR
Edwin K. Conover
BY
his ATTORNEYS

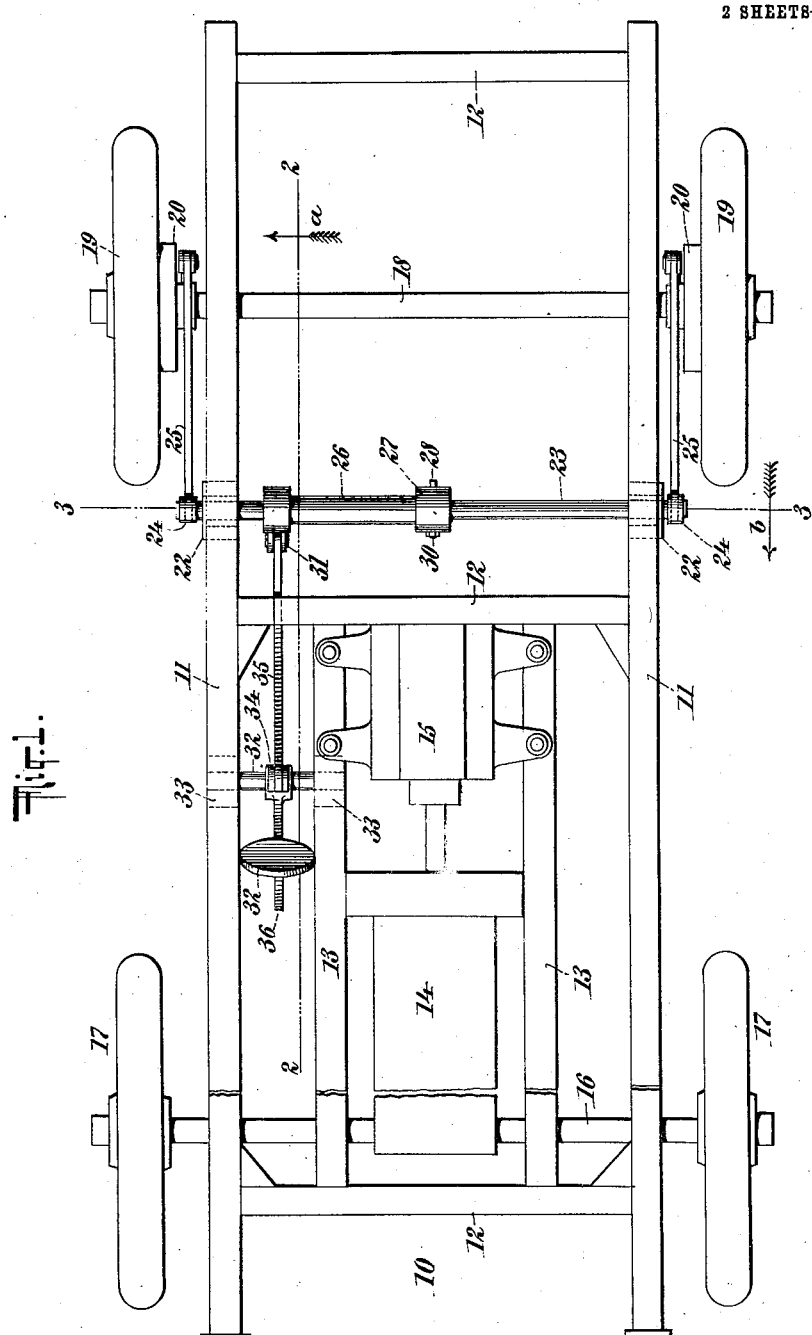

UNITED STATES PATENT OFFICE.

EDWIN K. CONOVER, OF PATERSON, NEW JERSEY, ASSIGNOR TO CONOVER MOTOR CAR COMPANY, OF PATERSON, NEW JERSEY, A CORPORATION OF NEW JERSEY.

BRAKE-OPERATING APPARATUS.

1,076,100.   Specification of Letters Patent.   Patented Oct. 21, 1913.

Application filed April 16, 1907. Serial No. 368,569.

*To all whom it may concern:*

Be it known that I, EDWIN K. CONOVER, a citizen of the United States, residing at Paterson, Passaic county, in the State of New Jersey, have invented certain new and useful Improvements in Brake-Operating Apparatus, of which the following is a full, clear, and exact specification.

My invention relates to improvements in motor vehicles, and the same has for its object more particularly to provide a simple, efficient and reliable apparatus for actuating the brakes of the vehicle.

Further said invention has for its object to provide an apparatus for conveniently and efficiently operating that type or form of brake wherein a separate device is provided for or adjacent to each wheel on the driving shaft.

Further said invention has for its object to provide an apparatus wherein the power applied to the brake operating apparatus or mechanism will be transmitted equally to the brake device of each wheel in order that the retarding force of said brake devices will be caused to act upon each of said wheels in like manner and to the same degree.

To the attainment of the aforesaid objects and ends my said invention consists in the novel details of construction, and in the combination, connection and arrangement of parts hereinafter more fully described and then pointed out in the claims.

In the accompanying drawings forming part of this specification, wherein like numerals of reference indicate like parts, Figure 1 is a plan or top view showing diagrammatically a motor vehicle frame and parts with a brake operating apparatus constructed according to, and embodying my said invention; Fig. 2 is a longitudinal section taken on the line 2—2 of Fig. 1, looking in the direction of the arrow *a;* Fig. 3 is a transverse section taken on the line 3—3 of Fig. 1, looking in the direction of the arrow *b*, and Fig. 4 is a section taken on the line 4—4 of Fig. 3 showing the manner of keying the several parts together.

In said drawings 10 designates the vehicle frame comprising the longitudinal side members 11, 11 connected together by transverse members 12, 12. Between the forward transverse members 12, 12 are secured short longitudinal members 13, 13 upon which are mounted in the customary way a motor 14, and transmission 15. The forward end of the frame is mounted upon an axle 16 provided with steering wheels 17, 17, and the rear end of the frame is mounted, in the usual manner, upon a driving shaft 18 provided at its ends with wheels 19, 19 and adjacent to said wheels with brake drums 20, 20, provided with operating levers 21, 21.

The vehicle as above briefly described is of ordinary general construction, and forms no part of my invention. It is merely given in order to more readily understand my invention about to be described.

Upon the outer sides of the side members 11, 11 adjacent to the driving shaft 18 are bolted depending bearings 22, 22 in which is supported a transverse shaft 23. Upon the outer ends of said shaft are keyed the upper ends of depending arms 24, 24 which are pivotally secured at their lower ends to the upper ends of the brake levers 21, 21 by rods 25, 25. Upon the transverse shaft 23 intermediate the bearings 22, 22 is disposed a tubular member or sleeve 26 which extends from a point near one of the side members 11 to the middle of said transverse shaft 23. At its inner end said tubular member 26 is provided with a collar 27 having a transverse opening therein to receive a tapering bolt or key 28 which also passes through a recess 29 in the shaft 23 and is secured in position by a nut 30. Upon the outer end of said tubular member 26 is fixed the upper end of a depending arm 31.

Upon the underside of the frame 10 adjacent to its forward end is arranged transversely of the frame a short shaft 32 which is supported in bearings 33, 33 secured to the underside of one of the side members 11, and the adjoining short longitudinal frame member 13. Upon said short shaft 32 is fixed an arm 34 which extends upwardly therefrom, and has its end pivotally connected to the end of the depending arm 31 secured to the outer end of the tubular member 26 surrounding the transverse shaft 23 by a rod 35, and 36 denotes a bell-crank lever having the end of its depending member secured to the short shaft 32, and the end of its upwardly extending member provided with a foot plate 37.

The operation of the apparatus is as follows: The brake mechanism proper arranged within the cylinders or drums 20, 20 is held normally out of engagement. As soon as power is applied to operating mechanism due to the operator pressing down the bell-crank lever 36, the shaft 32 and arm 34 will be partially rotated, and the rod 35 moved forward, together with the arm 31 on the tubular member 26 carried by the shaft 23. As the inner end of the tubular member 26 is secured to the shaft 23 midway between its ends any force or power applied to said tubular member 26 will cause the same and the shaft 23 to be simultaneously rotated, and the depending arms 24, 24 draw the rods 25, 25 forwardly and partially rotate the brake levers 21, 21 and thereby actuate the brake mechanism proper contained in the drums or cylinders 20, 20. As soon as the pressure upon the foot plate 37 is removed the parts will be restored to their initial positions.

In the operation of the apparatus it is to be particularly noted that as the power is transmitted from one side of the vehicle frame to the middle of the shaft 23, the force with which the brake mechanisms are operated is equal in degree or pressure, since whatever power may be lost owing to the torsional strain on the tubular member 26 on the shaft 23 is sustained equally by the opposite ends of the shaft 23 and the power transmitted simultaneously from the ends thereof equally to the brake mechanisms, and the same degree of frictional engagement of the brakes rendered uniform and alike at each side of the vehicle.

Having thus described my invention, what I claim and desire to secure by Letters Patent is:

1. In a vehicle, the combination with a pair of brakes, of a shaft connected at each of its ends with one of said brakes, an operating lever, a sleeve surrounding said shaft and secured at one end to said shaft midway between the ends thereof, and means connecting the other end of said sleeve with said operating lever whereby when said lever is actuated power is applied to said shaft midway between its ends and said brakes caused to engage the wheels with equal force, substantially as specified.

2. In a vehicle, the combination with a pair of brakes, of a transverse shaft supported upon the vehicle frame, arms secured to the outer ends of said shaft, links connecting the ends of said arms with said brakes, a sleeve surrounding said shaft having one end fixed to said shaft at a point midway between the ends thereof, and having its other end terminating adjacent to one of the ends of said shaft, a depending arm secured to the outer end of said sleeve, a short shaft supported upon the vehicle parallel to the shaft first named, an operating lever and an upwardly projecting arm secured to said short shaft, and a link connecting said upwardly-projecting arm with the depending arm on the sleeve surrounding said first named shaft, substantially as specified.

Signed at the city of New York, in the county and State of New York, this tenth day of April, nineteen hundred and seven.

EDWIN K. CONOVER.

Witnesses:
 CONRAD A. DIETERICH,
 ANNIE R. ANGUS.